(12) United States Patent  
Lilly et al.

(10) Patent No.: US 7,647,241 B1  
(45) Date of Patent: Jan. 12, 2010

(54) COMPUTER PROGRAM PRODUCT FOR DETERMINING AND REDUCING CUSTOMER SERVICE IMPACT

(75) Inventors: Michael P. Lilly, Candia, NH (US); Mark A. Longmire, Dover, NH (US); Richard D. Carignan, Derry, NH (US)

(73) Assignee: Infor Global Solutions (Veenendaal) B.V, Barneveld (NL)

( * ) Notice: Subject to any disclaimer, the term of this patent is extended or adjusted under 35 U.S.C. 154(b) by 403 days.

(21) Appl. No.: 09/690,566

(22) Filed: Oct. 17, 2000

Related U.S. Application Data

(63) Continuation-in-part of application No. 09/421,834, filed on Oct. 20, 1999, now Pat. No. 7,039,595, and a continuation-in-part of application No. 09/593,336, filed on Jun. 14, 2000, now Pat. No. 6,801,820, which is a continuation of application No. 09/065,932, filed on Apr. 24, 1998, now Pat. No. 6,088,626, which is a continuation of application No. 08/250,179, filed on May 27, 1994, now Pat. No. 5,787,000.

(60) Provisional application No. 60/105,129, filed on Oct. 21, 1998, provisional application No. 60/160,447, filed on Oct. 19, 1999.

(51) Int. Cl.  
*G06F 19/00* (2006.01)

(52) U.S. Cl. ................... 705/10; 705/8; 700/36

(58) Field of Classification Search .......... 705/1, 705/7, 8, 42, 10; 700/36, 97, 99, 96, 108; 702/84  
See application file for complete search history.

(56) References Cited

U.S. PATENT DOCUMENTS

| | | | |
|---|---|---|---|
| 3,705,410 A | 12/1972 | Kooy et al. | 444/1 |
| 4,218,616 A | 8/1980 | Loomer | 250/223 |
| 4,336,589 A | 6/1982 | Smith et al. | 364/403 |
| 4,340,810 A | 7/1982 | Glass | 235/375 |

(Continued)

FOREIGN PATENT DOCUMENTS

WO     WO 97/13211    *   4/1997

OTHER PUBLICATIONS

A plant engineer's guide to microcomputer applications software. Kazel, Jeanine. Plant Engineering, v39, p. 48(24), Jun. 27, 1985.*

(Continued)

*Primary Examiner*—Beth V Boswell  
*Assistant Examiner*—Justin M Pats  
(74) *Attorney, Agent, or Firm*—Blank Rome, LLP

(57) ABSTRACT

In general, in one aspect, the invention features a computerized method for determining customer service impact. The method includes receiving item orders having a requested completion date. The method also includes scheduling a scheduled completion date for each item order. The method also includes selecting at least one item order, each item order having a scheduled completion date. The method also includes comparing the scheduled completion date with the requested completion date for each selected item order. The method also includes deriving a customer service measurement for each selected item order based on the comparing step. The method can include the optional step of reporting and/or displaying customer service measurement data. In general, in another aspect, the invention relates to a system for determining customer service impact that performs the method steps just described.

15 Claims, 20 Drawing Sheets

U.S. PATENT DOCUMENTS

| | | | | |
|---|---|---|---|---|
| 4,459,663 A | | 7/1984 | Dye | 364/200 |
| 4,509,123 A | | 4/1985 | Vereen | 364/300 |
| 4,588,881 A | | 5/1986 | Pejas et al. | 235/385 |
| 4,621,325 A | | 11/1986 | Naftzger et al. | 364/406 |
| 4,646,238 A | | 2/1987 | Carlson, Jr. et al. | 364/403 |
| 4,648,023 A | * | 3/1987 | Powell | 700/36 |
| 4,697,753 A | | 10/1987 | Schippers et al. | 242/18.1 |
| 4,783,740 A | | 11/1988 | Ishizawa et al. | 364/403 |
| 4,827,423 A | * | 5/1989 | Beasley et al. | 700/96 |
| 4,937,743 A | | 6/1990 | Rassman et al. | 364/401 |
| 5,038,283 A | | 8/1991 | Caveney | 364/403 |
| 5,089,970 A | | 2/1992 | Lee et al. | 364/468 |
| 5,101,352 A | | 3/1992 | Rembert | 364/401 |
| 5,105,362 A | * | 4/1992 | Kotani | 700/108 |
| 5,128,860 A | * | 7/1992 | Chapman | 700/99 |
| 5,136,497 A | | 8/1992 | Coe et al. | 364/165 |
| 5,172,313 A | | 12/1992 | Schumacher | 364/401 |
| 5,193,065 A | | 3/1993 | Guerindon et al. | 364/468 |
| 5,202,837 A | | 4/1993 | Coe et al. | 364/476 |
| 5,216,593 A | | 6/1993 | Dietrich et al. | 364/402 |
| 5,233,533 A | | 8/1993 | Edstrom et al. | 364/468 |
| 5,241,465 A | * | 8/1993 | Oba et al. | 705/8 |
| 5,249,120 A | * | 9/1993 | Foley | 705/1 |
| 5,283,745 A | | 2/1994 | Tanaka | 364/468 |
| 5,291,397 A | * | 3/1994 | Powell | 700/97 |
| 5,303,144 A | | 4/1994 | Kawashima et al. | 364/401 |
| 5,325,304 A | | 6/1994 | Aoki | 364/468 |
| 5,334,822 A | | 8/1994 | Sanford | 235/385 |
| 5,381,332 A | * | 1/1995 | Wood | 705/8 |
| 5,395,206 A | | 3/1995 | Cerny, Jr. | 414/786 |
| 5,403,147 A | | 4/1995 | Tanaka | 414/786 |
| 5,430,831 A | | 7/1995 | Snellen | 395/133 |
| 5,440,480 A | | 8/1995 | Costanza | 364/401 |
| 5,450,317 A | | 9/1995 | Lu et al. | 364/402 |
| 5,463,555 A | | 10/1995 | Ward et al. | 364/468 |
| 5,485,369 A | | 1/1996 | Nicholls et al. | 364/401 |
| 5,487,143 A | | 1/1996 | Southgate | 395/157 |
| 5,548,518 A | | 8/1996 | Dietrich et al. | 364/468.06 |
| 5,568,393 A | | 10/1996 | Ando et al. | 364/478.02 |
| 5,586,021 A | | 12/1996 | Fargher et al. | 364/468 |
| 5,596,502 A | | 1/1997 | Koski et al. | 364/468.01 |
| 5,600,565 A | | 2/1997 | Wagner et al. | 364/478.07 |
| 5,630,070 A | | 5/1997 | Dietrich et al. | 395/208 |
| 5,712,989 A | | 1/1998 | Johnson et al. | 395/228 |
| 5,726,914 A | * | 3/1998 | Janovski et al. | 702/84 |
| 5,787,000 A | | 7/1998 | Lilly et al. | 364/468.01 |
| 6,195,590 B1 | * | 2/2001 | Powell | 700/36 |
| 6,202,054 B1 | * | 3/2001 | Lawlor et al. | 705/42 |
| 6,516,301 B1 | * | 2/2003 | Aykin | 705/10 |
| 7,039,595 B1 | * | 5/2006 | Lilly et al. | 705/8 |

OTHER PUBLICATIONS

One-Processor Scheduling with Symmetric Earliness and Tardiness Penalties. Garey, Michael R., Tarjan, Robert E., Wilfrong, Gordon T., Mathematics of Operations Reseach v13n2, pp. 330-348, May 1988.*

Kleinfeld, Ira H., "Engineering Economics", John Wiley and Sons, 1993, pp. 33-36, retrieved from: Google Books.*

Lee at al., Managing Supply Chain Inventory: Pitfalls and Opportunities, Sloan Management Review, vol. 33, No. 3, Spring 1992, p. 65-73.*

Schneidermann, Metrics for the Order Fulfillment Process (Part 2), Journal of Cost Management, vol. 10, No. 3, Fall 1996, p. C1-C12.*

"Common Sense Throughput for CEOs," Lilly Software Associates, Inc., Hampton, NH, approx. publication date Sep. 18, 1998.

Goldratt et al. *The Goal*, North River Press, Inc., Great Barrington, MA, 1984, pp. 60-61.

Klusewitz et al. "Constraint Management Through the Drum-Buffer-Rope System," *1996 IEEE/Semi Advanced Semiconductor Manufacturing Conference*, 1996, pp. 7-12.

Kosturiak et al. "Simulation in Production System Life Cycle," *Computer In Industry*, vol. 38, No. 2, Mar. 1999, pp. 159-172.

Bowman, Robert. "Strategies for International Shipping," *Distribution*, Oct. 1990, pp. 79-80.

Richardson, Helen. "T&D Recognizes Excellence in Logistics," *Transportation & Distribution*, vol. 32, No. 12, Dec. 1991, 5 pages.

Zurier, Steve. "Delivering Quality Customer Service: Distributors Striving for Zero Defects Have Found that to Make the Quality Process Work, They Must Involve Every Employee in the Company," *Industrial Distribution*, vol. 78, No. 3, p. 30, Mar. 1989, 4 pages.

Raia, Ernest. JIT Delivery: Redefining On-Time, *Purchasing*, vol. 109, No. 3, p. 64, Sep. 13, 1990, 4 pages.

Miller, Mark. "The Key to Recognition is Teamwork—Ironing Out Conflicts Will Yield Positive Results," *Electronic Buyers' News*, 1993, No. 865, Aug. 2, 1993, 2 pages.

Miller, Mark. "Don't Let Undependable Supplier Bug You—Five Principles to Help Boost the Rate of On-Time Deliveries," *Electronic Buyers' News*, 1993, No. 839, Feb. 1, 1993, 2 pages.

Potvin et at. "A Parallel Route Building Algorithm for the Vehicle Routing and Scheduling Problem with Time Windows," *Centre de recherche sur les transports—Publication #729*, Oct. 1990, Revised Jul. 1991—Apr. 1993, Montreal, 1-18.

* cited by examiner

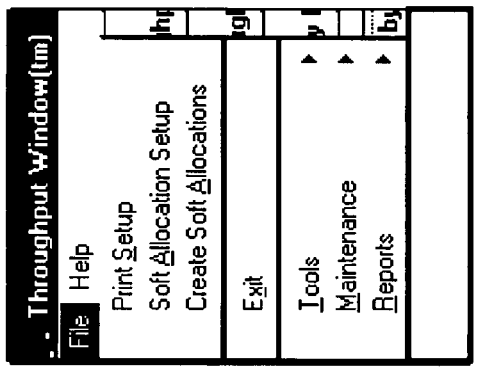

FIG. 2

SOFT ALLOCATIONS DATA TABLE

| COLUMN | TYPE | SIZE | SCALE | DESCRIPTION |
|---|---|---|---|---|
| CUST_ORDER_ID | CHAR | 15 | | ID OF CUSTOMER ORDER |
| CUST_ORDER_LINE_NO | SMALLINT | | | CUSTOMER ORDER LINE NUMBER |
| PART_ID | VARCHAR | 30 | | PART ID, MIGHT BE NULL (LINKED COLI ONLY) |
| WO_BASE_ID | VARCHAR | 30 | | WORK ORDER ID, MIGHT BE NULL (INDICATING INVENTORY AS SUPPLY SOURCE) |
| WO_LOT_ID | VARCHAR | 3 | | WORK ORDER LOT ID, MIGHT BE NULL (INDICATING INVENTORY AS SUPPLY SOURCE) |
| WO_SPLIT_ID | VARCHAR | 3 | | WORK ORDER SPLIT ID, MIGHT BE NULL (INDICATING INVENTORY AS SUPPLY SOURCE) |
| SUPPLY_DATE | TIMESTAMP | 10 | | DATE OF SUPPLY |
| QUANTITY | DECIMAL | 14 | 4 | QUANTITY ALLOCATED TO THIS CUSTOMER ORD LINE ITEM FROM THIS SOURCE |

FIG. 3

Customer Service Impact

Base Date: 4/17/2001

☑ Round Up Finish Date if Time After 5:00:00 PM

Selected Schedules:
- INCR FASSY
- INCR FASSY & QC
- MRP_PLAN
- STANDARD
- STD_NO_MTL Edit List — 250

☑ Use Selected Customers
- ABLE MANUFACTURING
- CENTRE GROUP
- CLEAR SKY INDUSTRIES
- FINE MANUFACTURERS
- FLEET BANK
- STANDARD PRODUCTS CORPORATION

Graph Options
- ⦿ Monthly
- ○ Weekly — Last Day of Week
- ○ Daily

Customer Service Measurement
- ⦿ Days Late     ○ Dollar-days Late
- ○ Dollars Late
- ○ Opportunity Lost    Yield %

[Ok] [Cancel] [Print]

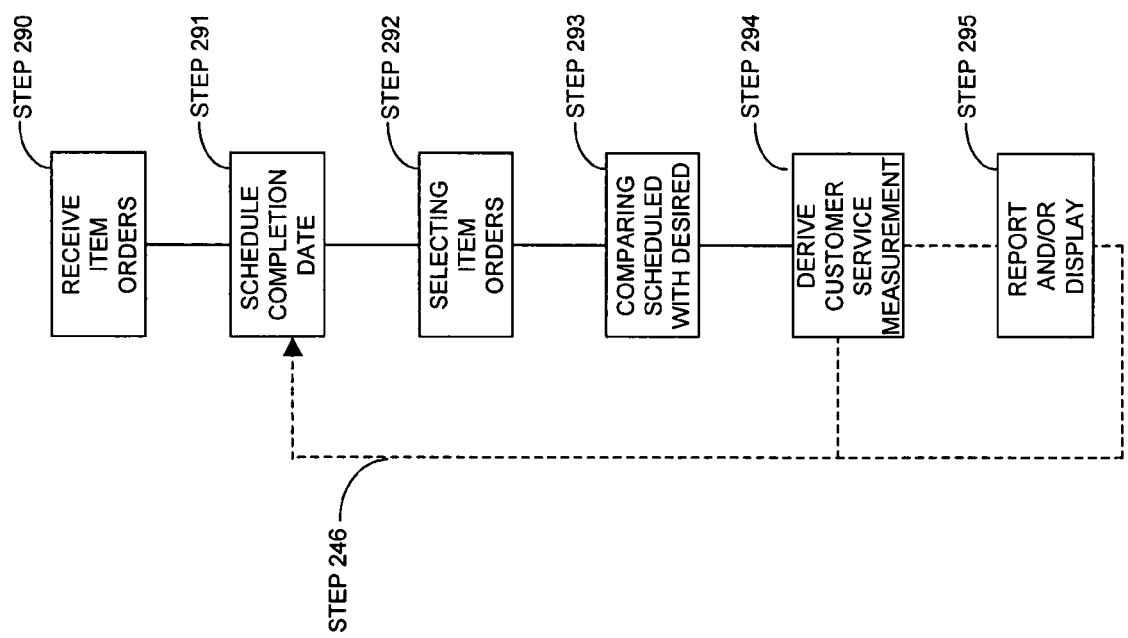

WIRE - WIRE-CUT MACHINE

| Work Order / Operation | Customer Order | Attempt Number | Direction | Result Detail | Part ID | Part Description | Severity | Attempt Start | Attempt End |
|---|---|---|---|---|---|---|---|---|---|
| 40046/1 10 | 02041/1 | 21 | F | 0.0.8.0 | | | 0.23 | 04/23/2001 7:30:00 AM | 04/23/2001 12:50:00 PM |
| 40048/1 10 | 02043/1 | 28 | F | 0.0.6.7 | | | 1.23 | 04/23/2001 7:30:00 AM | 04/24/2001 12:50:00 PM |
| 40023/1 10 | | 95 | F | 0.0.103.0 | MMT-1996-WM | WALL MOUN | 15.00 | 04/23/2001 7:30:00 AM | 04/25/2001 11:30:00 AM |

3 occurances  Severity = 16.46

FIG. 21

COMPUTER PROGRAM PRODUCT FOR DETERMINING AND REDUCING CUSTOMER SERVICE IMPACT

CROSS-REFERENCE TO RELATED APPLICATION

This application is a continuation-in-part of U.S. patent application Ser. No. 09/421,834, filed on Oct. 20, 1999, now U.S. Pat. No. 7,039,595 which claims priority to U.S. Provisional Patent Application Ser. No. 60/105,129 filed on Oct. 21, 1998, and this application is a continuation-in-part of U.S. patent application Ser. No. 09/593,336 now U.S. Pat. No. 6,801,820, filed Jun. 14, 2000, which is a continuation of U.S. patent application Ser. No. 09/065,932, now U.S. Pat. No. 6,088,626, filed Apr. 24, 1998, which is a continuation of U.S. patent application Ser. No. 08/250,179, now U.S. Pat. No. 5,787,000, filed May 27, 1994, and this application claims priority to U.S. Provisional Patent Application Ser. No. 60/160,447, filed Oct. 19, 1999.

TECHNICAL FIELD

The invention relates to manufacturing and distribution facility management and, more particularly, to computer-based tools for improving the profitability of manufacturing and distribution facilities.

BACKGROUND INFORMATION

Manufacturing and distribution facility managers use metrics to measure the productivity of a facility, and to determine what changes can be made to improve the operation of the facility. Metrics are used because it is difficult for any one person to otherwise understand how a large, complex system such as a manufacturing or distribution facility is performing. The choice of metric is important because changes that improve the facility as measured by the chosen metric are judged to be worthwhile and are encouraged by facility management. Changes that deplete the operation of the plant, as measured by the chosen metric, are judged to be detrimental to the operation of the facility, and are therefore discouraged by facility management.

SUMMARY OF THE INVENTION

Although computer-based tools have been available for the purpose of managing systems such as manufacturing plants, there is a need for a software tool that can help a manufacturing facility manager effectively determine the customer service impact of scheduling changes. An important ingredient to a company's success is how well the company services its customer's demands. It is therefore useful for suppliers to measure their own expected delivery performance. For example, a customer service impact display in one embodiment of the invention shows the degree of lateness of one or more customer orders. A manager can identify work orders which are scheduled to be late, and that will affect the timely shipment of future customer orders. A manager can identify the impact of lateness on one or more customers, and compare the impact of scheduling changes. A manager can also use tools such as utilization, contention, and material constraint inquiries to identify the cause of lateness in order to correct it.

Customer service impact can be measured in a number of ways. For example, customer service impact can be measured by measuring the amount of time by which an item order is late, that is by determining the time difference between the desired completion date and the scheduled completion date. The time late can be measured in various ways. For example the time difference can be measured in days, hours, minutes, or even weeks, months, or years, or some combination. As another example, the number of days late can be used to measure customer service impact.

Customer service impact can also be measured by determining the value of a late item order, such as by determining the number of units that are late, multiplying that number by the unit price and subtracting any commission or discounts. For example, the dollar amount late can be used to measure customer service impact.

Customer service impact can also be measured by determining the value-time late, that is, by determining the time difference between the desired completion date and the scheduled completion date, and multiplying the time difference by the value (as described above) of the late item order. For example, the dollars-days measurement for an item order that is 4 days late and has a value of $1000.00 would be 4000 dollar-days.

Customer service impact can also be measured by measuring the opportunity lost, that is the amount of money a company would lose by not being able to put the revenue from the item order into an investment, such as a money market account. The opportunity lost can be determined by multiplying the time difference by the value and multiplying the result by a predetermined interest rate. For example, in a simple implementation, the opportunity lost is the value-days measurement multiplied by a daily interest rate. In a more complex implementation, a compounding interest formula is used.

Customer service impact, whether measured in terms of time, money, or some combination of the two, is useful for providing the manager with a way of determining the customer service impact of a schedule. Scheduling changes can be made to minimize customer service impact, or to minimize the customer service impact on one or a group of particular customers.

In general, in one aspect, the invention features a computerized method for determining customer service impact. Item orders having a requested completion date are received. A completion date for each item order is scheduled. One or more item orders, each having a scheduled completion date, are selected, and the scheduled completion dates for the item orders are compared with the requested completion dates. A customer service measurement is derived for each selected item order based on the comparison. Optionally, customer service measurement data is reported and/or displayed.

In another aspect, the invention relates to a system for determining customer service impact. The system includes a receiver for receiving item orders, and a scheduler for scheduling a scheduled completion date for each item order. The system also includes a selector for selecting at least one item order, each item order having a scheduled completion date, and a comparitor for comparing the scheduled completion date with the requested completion date for the selected at least one item orders. The system also includes a measurement subsystem for deriving a customer service measurement for each selected item order based on the comparison.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 2 is an embodiment of the file menu of FIG. 1;

FIG. 3 is an embodiment of a soft allocations data table;

FIG. 13 is an embodiment of the customer service impact inquiry interface of FIG. 6 showing an inquiry for impact on selected customers;

FIG. 14 is an embodiment of the customer service impact inquiry interface of FIG. 6 showing an inquiry for impact on multiple schedules;

FIG. 17 is a flowchart of a method according to an embodiment of the invention;

FIG. 21 is a display of detail information for the example of FIG. 20.

DETAILED DESCRIPTION

Figure 1:
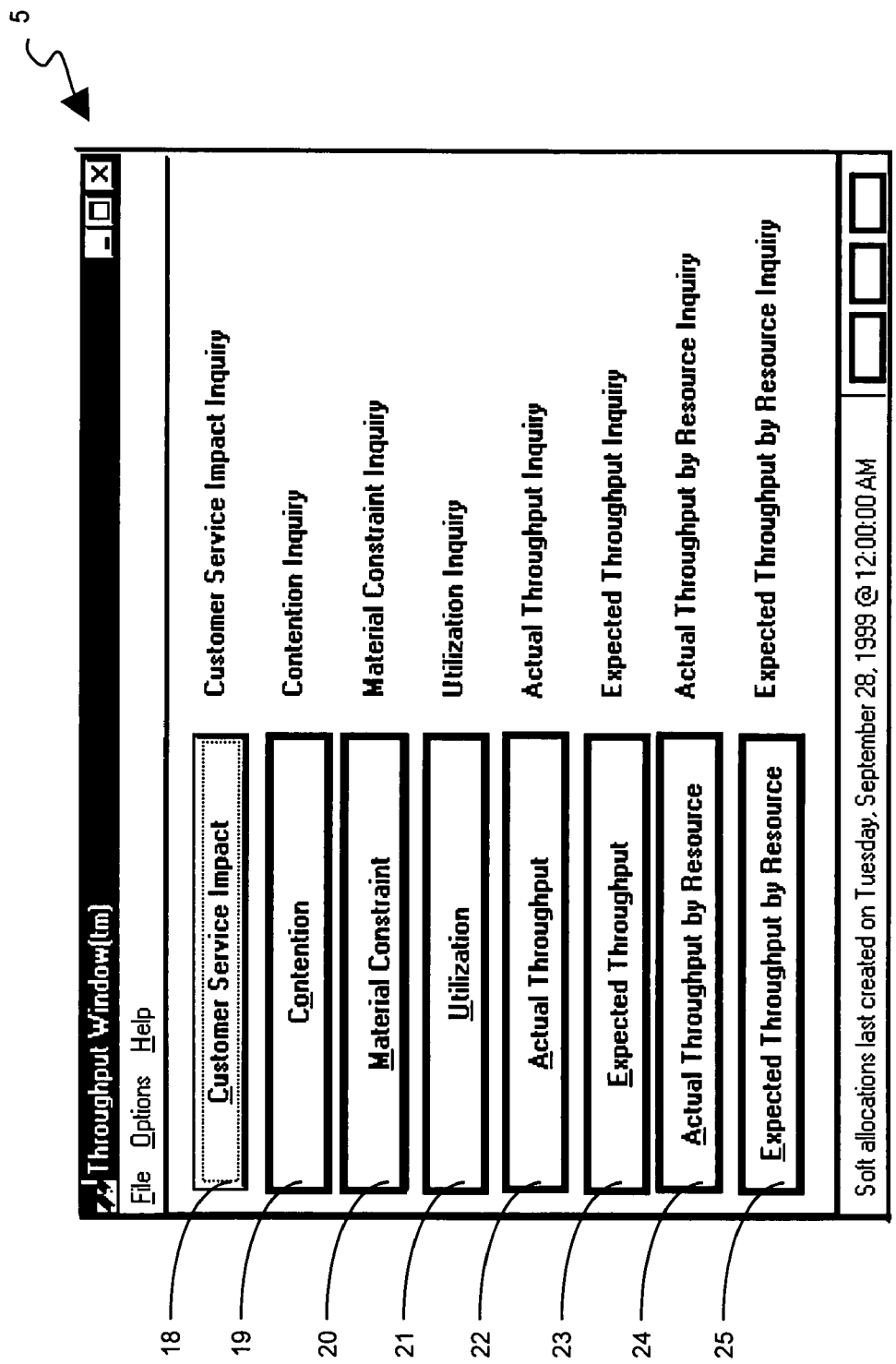
FIG. 1 is an embodiment of a measurement tool selection interface.

Referring to FIG. 1, a tool for determining customer service impact is incorporated into a scheduling software program. In the example embodiment of FIG. 1, the tools are implemented as software running on a general-purpose computer, such as a INTEL PENTIUM-based personal computer running the MICROSOFT WINDOWS NT operating system, although the invention is not limited to that particular implementation. One example of such a scheduling program is VISUAL MANUFACTURING, distributed by Lilly Software Associates, Inc. of Hampton, N.H. A user of the scheduling software program can complete a scheduling operation, and then use software-based tools to evaluate the schedule that results from the scheduling operation.

The software based tools are accessed through a user interface. The user interface, referred to as the Throughput Window 5, allows the user to select inquiries for Customer Service Impact Inquiry 18, Contention Inquiry 19, Material Constraint Inquiry 20, Utilization Inquiry 21, Actual Throughput Inquiry 22, Expected Throughput Inquire 23, Actual Throughput by Resource Inquiry 24, and Expected Throughput by Resource Inquiry 25. The operation of some of these inquires 18-25 are described in co-pending U.S. patent application Ser. No. 09/421,834 filed on Oct. 20, 1999, entitled SYSTEM AND METHOD FOR THROUGHPUT MEASUREMENT, which is incorporated herein by reference.

Referring to FIG. 2, in one embodiment, the software-based tools of FIG. 1 use a matching of supply and demand referred to as "soft allocations." The supply (i.e. work orders and inventory) are matched up with demand (i.e. customer orders) so that data associated with the supply, such as scheduled completion date, can be matched up with data associated with the demand, such as requested completion date. This matching may or may not determine which items actually are used for which customer orders. For example, the allocation may be used solely for the calculation of metrics such as customer service impact or throughput. In one embodiment, soft allocations are accomplished separately from the metric calculating and reporting mechanisms that use the soft allocations, so that the soft allocations can be allocated once, and numerous reports and/or inquiries utilities can use the same soft allocations information. For example, the customer service impact and expected throughput for several different schedules can be compared using the same soft allocations.

Referring to FIG. 3, an embodiment of the soft allocations generator uses a data table that correlates between an item and its source of material and service information. The elements of the soft allocations data table include a customer order identifier ("CUST_ORDER_ID"), a customer order line number ("CUST_ORDER_LINE_NO"), a part identifier ("PART_ID"), a work order identifier ("WO_BASE_ID"), a work order lot identifier ("WO_LOT_ID"), a work order split identifier ("WO_SPLIT_ID"), and a quantity allocated to this customer order line item from this source. These elements provide the necessary information to identify the customer order, to which the item is allocated, and the work order that is the source of the item, if the demand is not supplied from existing inventory.

It is possible that some work orders may already be "linked" to customer orders outside of the soft allocations process. For example, if a make-to-order part is made specifically for a particular customer, the customer order for that make-to-order part may be linked to the work order for that part. The soft allocations generator can be configured to recognize such links, and to allocate first the customer orders and work orders that are linked. If work orders and customer orders are not already linked, they are matched based on their dates. In other words, the earliest customer orders are matched to existing inventory. After current inventory is allocated, work orders are allocated, based on the desired completion date of the work order. The soft allocations generator generates a row in the soft allocations table for each unshipped customer order line to which a work order is matched. The soft allocations generator verifies that the total quantity allocated for work orders matched to a customer order does not exceed the desired quantity. There may be inventory listed in the system that has been labeled "unavailable" or "on-hold" for various reasons. A user can optionally configure the soft allocations generator to allocate a quantity that is unavailable or an on-hold quantity.

At the time that soft allocations are generated, all existing soft allocation records are removed from the soft allocations table. All allocations are recalculated and the soft allocations table is regenerated. The soft allocations generator creates a first array, referred to as a "demand array" of unshipped customer order line items, to which soft allocations have not been made in full. In one embodiment, these are sequenced by part identifier and desired ship date. The soft allocations generator also creates a second array, referred to as a "supply array," of inventory, firmed (planned and scheduled but deliberately not yet allowed to be worked on) work orders, and released (planned, scheduled and intended to be worked on) work orders from which soft allocations have not been made in full. These are in want-date (desired completion date) sequence. A work order that has co-products, meaning that more than one part will be produced by the work order, appears in this array multiple times, once for each part being produced.

One by one, in the order that they are stored in the demand array, each customer order line item is matched to inventory and firmed and released work orders in the supply array. Optionally, the user can configure the soft allocations generator to allocate inventory labeled as "unavailable" and "on hold." If the customer order line item in the demand array is fully satisfied by the soft allocations, the customer order line is removed from the demand array. When all inventory has been allocated, allocations are made from the next work order for that item. The process is finished for an item when either all the supply (inventory and work orders) or demand (line items from customer orders) have been allocated.

Optionally, a list of unallocated customer order lines and of unallocated work orders are provided in an audit text file. This list may be helpful to a manufacturing facility manager because it identifies customer orders for which work orders have not been allocated, and work orders for which there are no customer orders. There may be good reasons for a manufacturing facility to have work orders for which there are no customer orders, for example because of a forecasted demand. It still may be useful for manufacturing facilities management to review the list and verify that there are in fact good reasons why unallocated customer orders and work orders appear on the list.

Figures 4, 5:
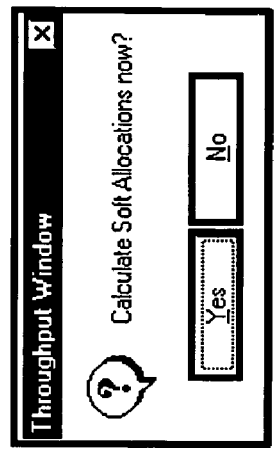
FIG. 4 is an embodiment of a soft allocations setup screen.
FIG. 5 is an embodiment of a soft allocations confirmation screen.

Referring again to FIG. 2, the Soft Allocations can be configured from the File Menu of the Throughput Window 5, with the choice of "Soft Allocation Setup." The soft allocation configuration options are shown in FIG. 4 on a Soft Allocation Setup window control when soft allocations are generated. The generator can be configured to automatically generate soft allocations at a particular time each day. For example, the generator can be configured to generate soft allocations once a day at midnight, or once a week on Wednesday at 3:06 P.M. A timer runs as software that is "sleeping" until the specified time for execution arrives. The Soft Allocation Setup is used to control when the Soft Allocations function is executed.

The selection of the "create" button on the Soft Allocation Setup window will create soft allocations immediately. Referring again to FIG. 2, a user also can manually initiate the creation of soft allocation with the menu choice "Create Soft Allocations." If soft allocations are initiated manually, a confirmation screen, shown in FIG. 5, confirms that Soft Allocations should be processed.

Referring again to FIG. 4, the user is also presented with three options on the Soft Allocation Setup Window: (1) Allocate Linked Orders First; (2) Allocate Unavailable Inventory; and (3) Allocate On-Hold Inventory. One or more of these options can be selected at the same time. The Allocate Linked Orders First option, which is a default, causes a new row in the soft allocations table to be generated for each unshipped customer order line to which a work order is linked. The Allocate Unavailable Inventory and Allocate On-Hold Inventory options allow the soft allocations generator to allocate inventory that has been labeled "unavailable" and "on-hold" respectively. The soft allocations generator verifies that the total quantity allocated for a linked work order does not exceed the desired quantity on that work order.

Figure 6:
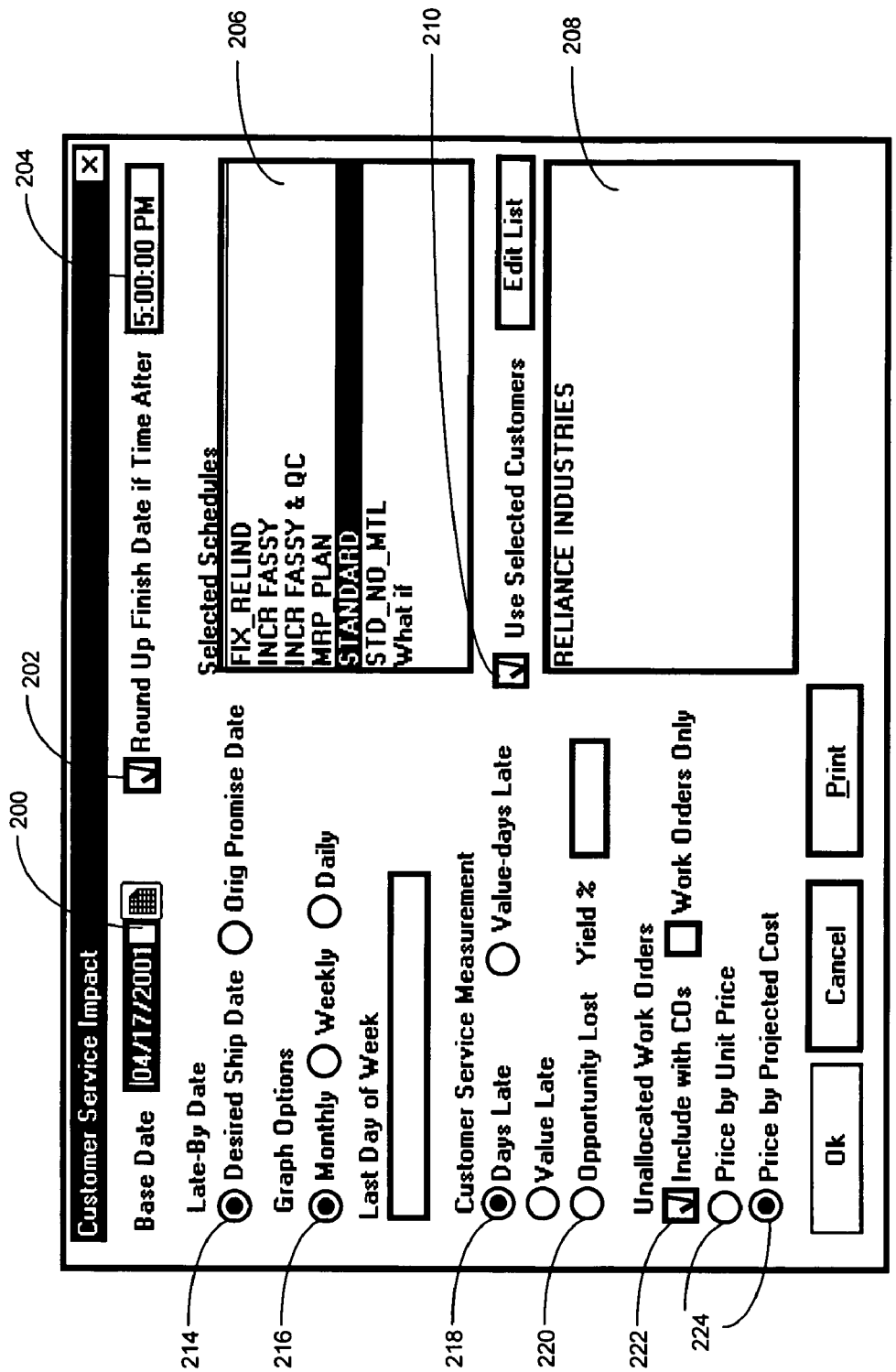
FIG. 6 is an embodiment of a customer service impact inquiry interface.

Referring to FIG. 6, a Customer Service Impact interface is accessed by selecting "Customer Service Impact" from the Throughput Window of FIG. 1. The Customer Service Impact interface allows a user to configure customer service impact analysis. The base date 200 is the date for the start of the inquiry analysis.

If the "Round Up Finish Date if Time After" selection 202 is checked, any work order scheduled to finish after the predetermined time 204, shown in the figure as 5:00 p.m., will be credited to the next day. This is used to prevent lateness of a fraction of a day from being summed. In one embodiment, this is implemented by determining the fraction of the day specified by the predetermined time 204. For example, if the time is 5 p.m. as shown in the figure 204, 5 p.m. is the $17^{th}$ hour of a day, or (17/24) 0.70 days. Any fractional lateness less than 0.70 days will be rounded down to the current day. In other words, an item order that is 6.5 days late will be considered 6 days late, while an item order that is 6.8 days late will be considered 7 days late.

A user can specify or choose one or more "Selected Schedules" 206 to run the Customer Service Impact analysis on. A user can optionally select one or more customers 208 to measure customer impact. If the "Use Selected Customers" box 210 is unchecked, the analysis is performed for all customers. A user can specify 214 by means of a radio button whether to use the desired ship date (i.e. the current ship date of a line item) or an original promise date (i.e. the first date that was agreed on for item shipment) for the lateness determination; both the ship date and the original promise date are stored in the demand order. A user can choose the scope of display 216, by selecting a monthly calendar display, a weekly calendar display, or a daily calendar display.

A user can choose the type of customer service measurement 218: days late, value late, value-days late or opportunity lost. If opportunity lost is selected, the user can select an interest rate 220 to use to measure the opportunity lost.

A user can determine how the tool manages unallocated work orders. For example, the user can choose 222 to include unallocated work orders with customer orders ("COs"). This includes unallocated late work orders with the resulting late customer orders. This is helpful, for example, for made-to-stock environments where product is being built in anticipation of customer orders. Alternatively, a user can choose whether to include only late work orders that are not linked or soft allocated to a customer order. Only one of these boxes can be checked at a time, and if one of these boxes is checked, the bottom two radio buttons 224 become activated, and the user can choose whether to price unallocated work orders by unit list price or by projected cost as set out on the associated work order. Generally, if it is a standard part, the list price would be used.

Figure 7:
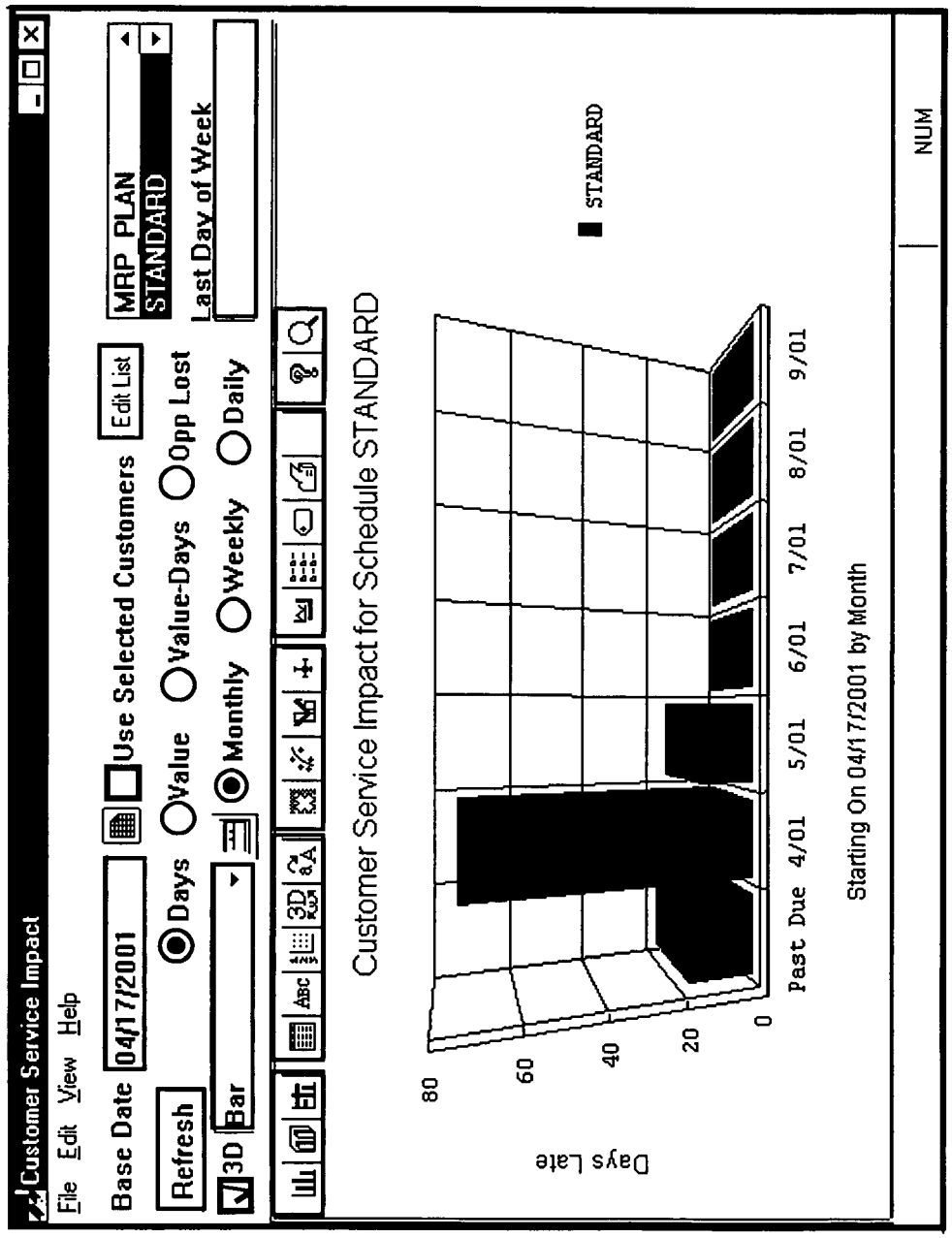
FIG. 7 is an embodiment of a customer service impact display showing days late for a single schedule.

Referring to FIG. 7 an exemplary Customer Service Impact Display includes a graph of "days late" that shows the cumulative days late for all customer orders in the STANDARD schedule for each month. The graph shows the total days late, where the number of days late is measured as the difference between the scheduled finish date and the want date, where the value used for the want date is specified in the Late-By Date selection 214 of FIG. 6 to be the original promise date or the desired ship date. The want date also determines the column in which an order's lateness is reflected. The controls at the top of the display allow a user to redraw the graph for a different metric (days, value, value-days, or opportunity lost), a different scale (monthly, weekly, daily), a different base date, a different schedule, or using a different type of graph. The user can also select specific customers instead of evaluating impact for all customers as is shown in the example.

Figure 8:
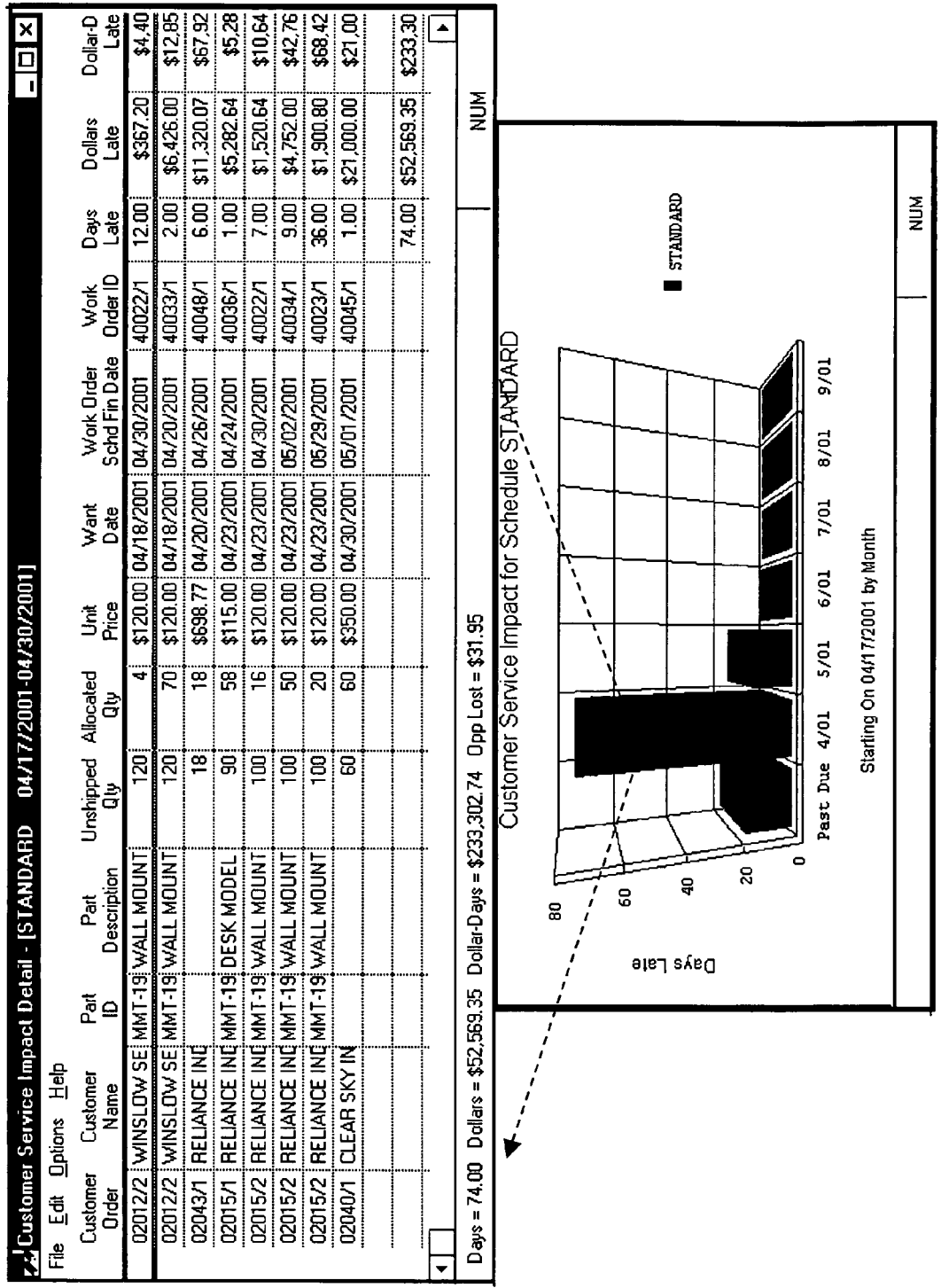
FIG. 8 is an embodiment of the display of FIG. 7 and showing detailed display of the display of FIG. 7.

Referring to FIG. 8, if a user clicks on a display bar for a particular month, the user is shown the detail for each item order that is included in that element of the customer service impact graph. If the user holds down the shift key and clicks on a display bar, the user is shown the detail for each item order in all the elements of the customer service impact graph. The detailed display includes customer and work order information, as well as summary and detail information.

Figure 9:
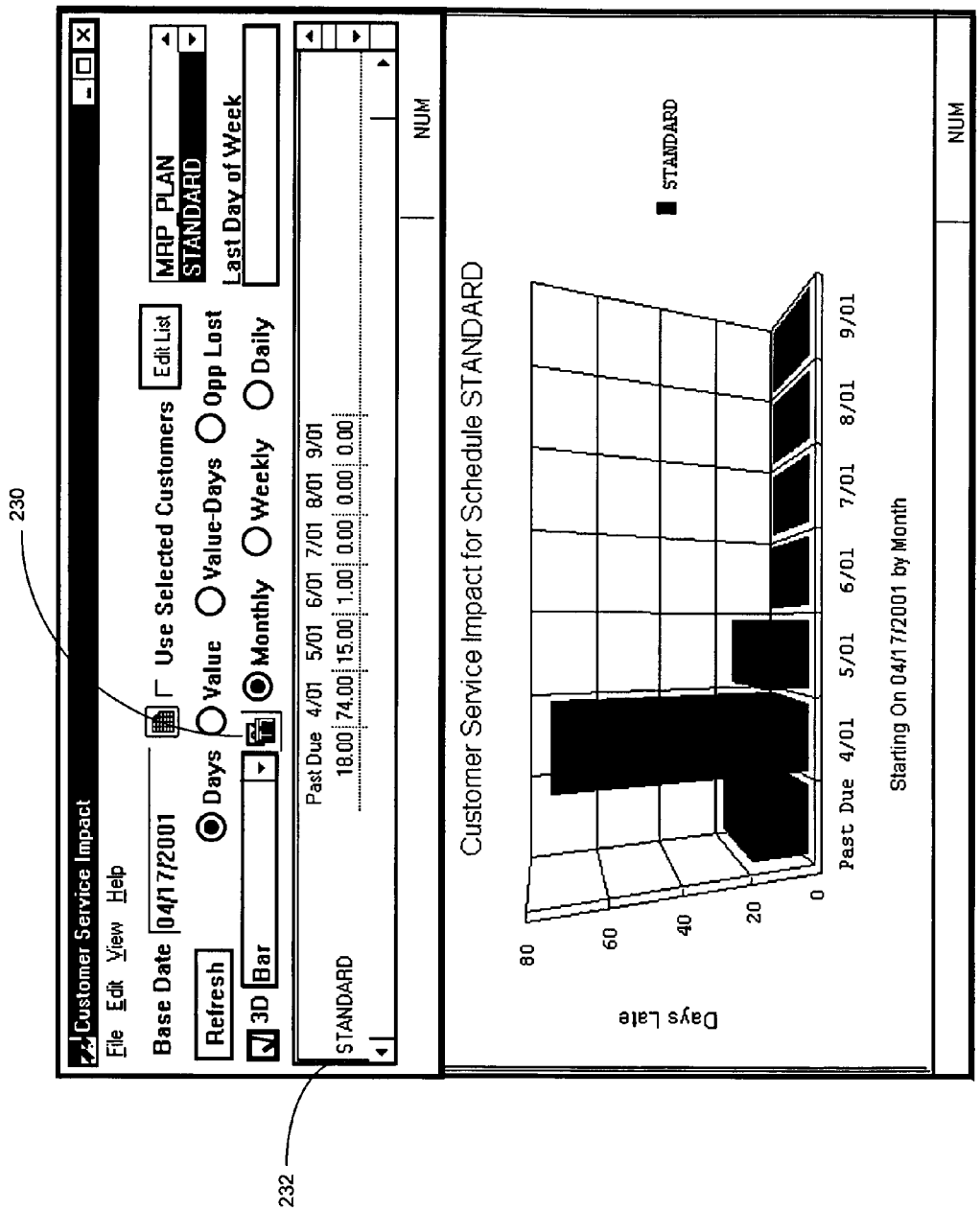
FIG. 9 is an embodiment of a customer service impact display showing numeric display of the graphed data.

Referring to FIG. 9, by clicking on an icon 230 next to the graph type, a user causes display of bar graph results 232 in a spreadsheet-like numeric display. Each value displayed corresponds to a bar on the graph.

Figure 10:
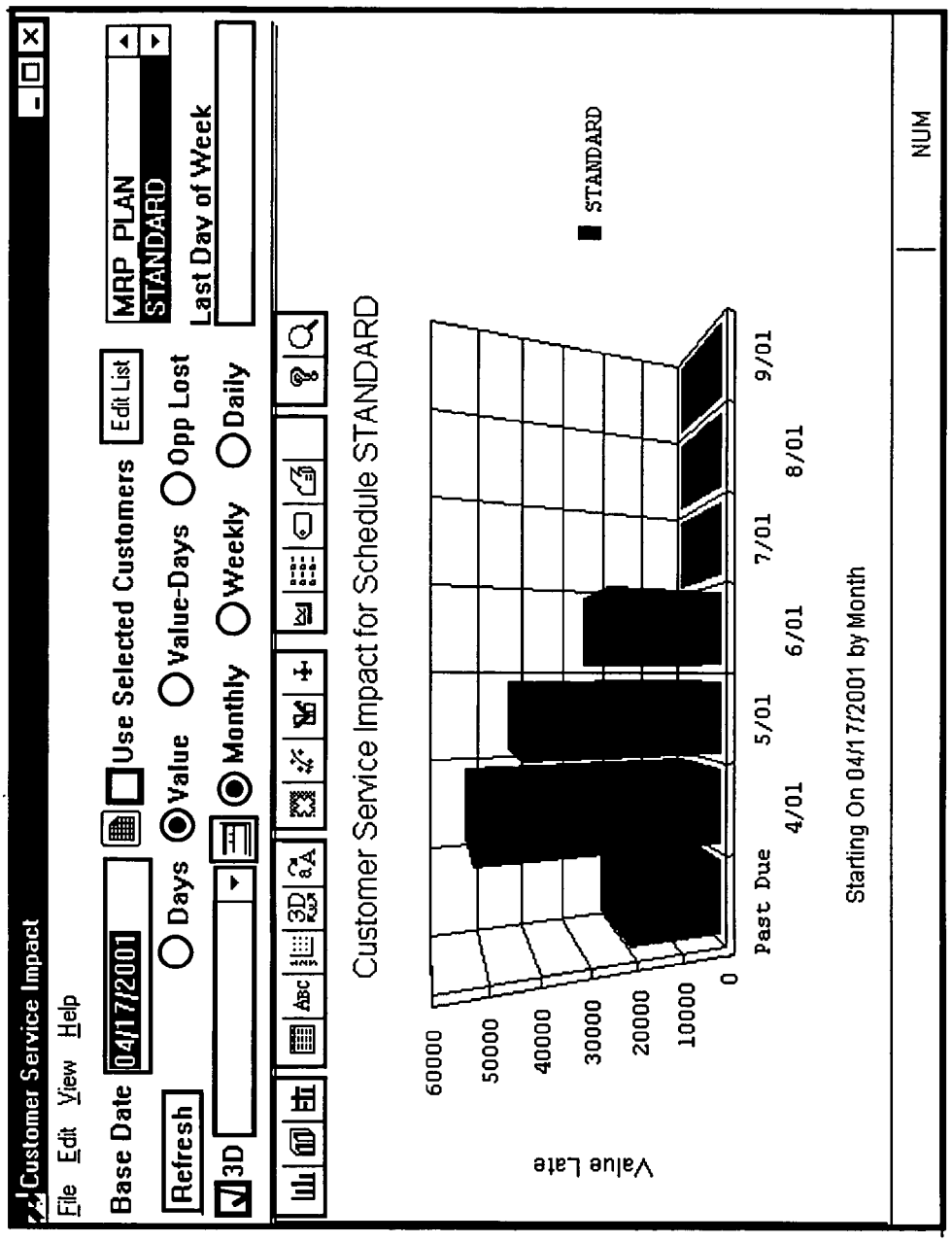
FIG. 10 is an embodiment of a customer service impact display showing the value late for a single schedule.

Referring to FIG. 10, a graph of the "value late" shows the value late for all customer orders in the STANDARD schedule for each month. The graph shows the total value late, where the value late is measured as the order quantity that is going to be late multiplied by the unit price less any commissions and discounts. The display allows the user to redraw the graph for a different metric (days, value, value-days, or opportunity lost), a different scale (monthly, weekly, daily), a different base date, a different schedule, or using a different type of graph. A user also can use selected customers instead of all customers as shown. By clicking on a bar for a particular element (here, the month), a user can see the detail for each order item that goes into the total customer service impact for that month. By holding down the shift key and clicking on a bar, the user can see the detail for all elements in the display. The detailed display includes customer and work order information, as well as summary and detail information. By clicking on an icon next to the graph type, the tool will display the bar graph results in a spreadsheet-like numeric display. Each value displayed corresponds to a bar on the graph.

Figure 11:
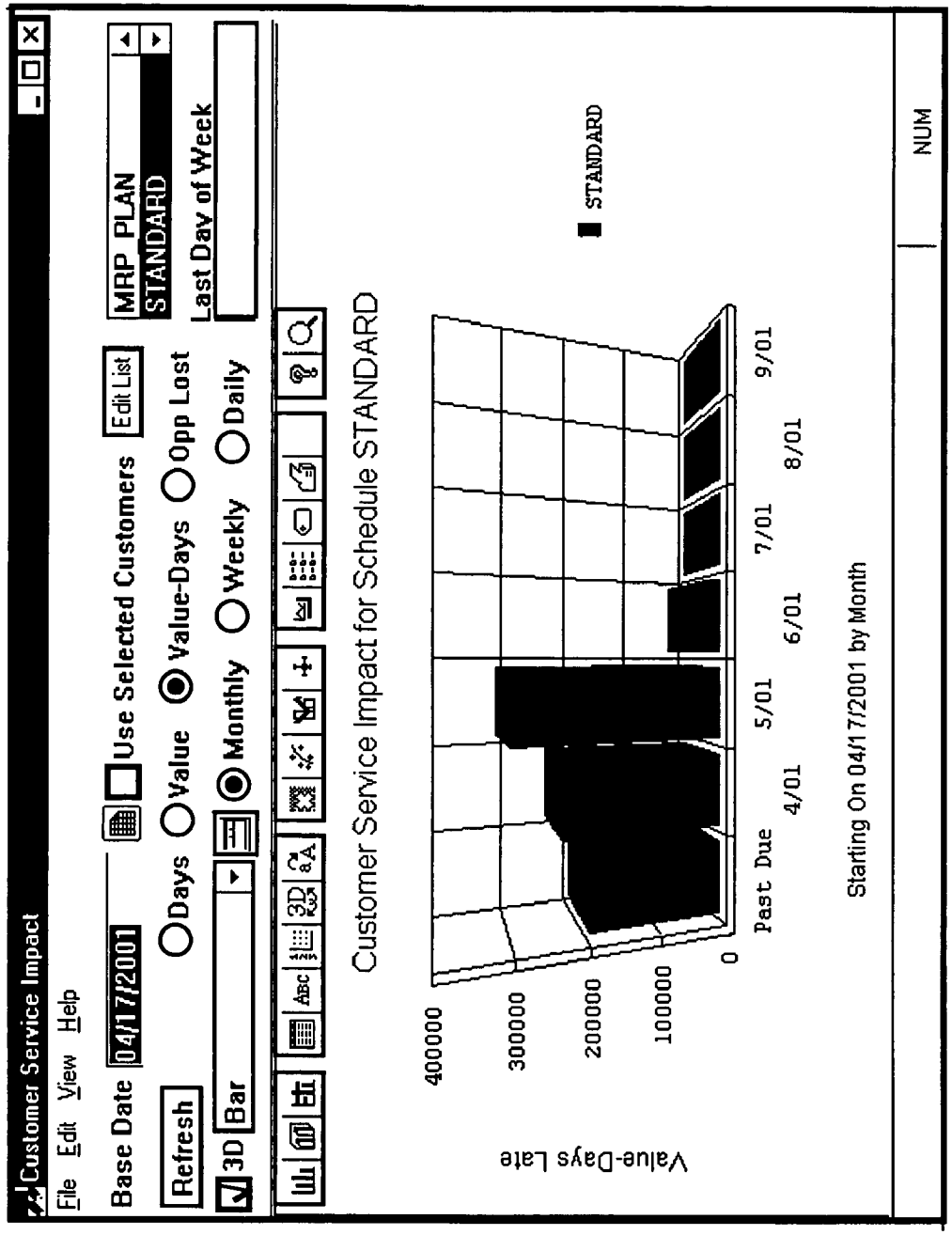
FIG. 11 is an embodiment of a customer service impact display showing value-days late for a single schedule.

Referring to FIG. 11, a graph of the "value-days late" shows the value-days (i.e. dollar-days) late for all customer orders in the STANDARD schedule for each month. The graph shows the total value-days late, where the value late is measured as the days late multiplied by the value (as above). The display allows the user to redraw the graph for a different metric (days, value, value-days, or opportunity lost), a different scale (monthly, weekly, daily), a different base date, a different schedule, or using a different type of graph. The user also can use selected customers instead of all customers as shown. By clicking on a bar for a particular element (here, a month), the user can see the detail for each order item that goes into the total customer service impact for that element. By holding down the shift key and clicking on a bar, the user can see the detail for all elements. The detailed display includes customer and work order information, as well as summary and detail information. By clicking on an icon next to the graph type, the tool will display the bar graph results in a spreadsheet-like numeric display. Each value displayed corresponds to a bar on the graph.

Figure 12:
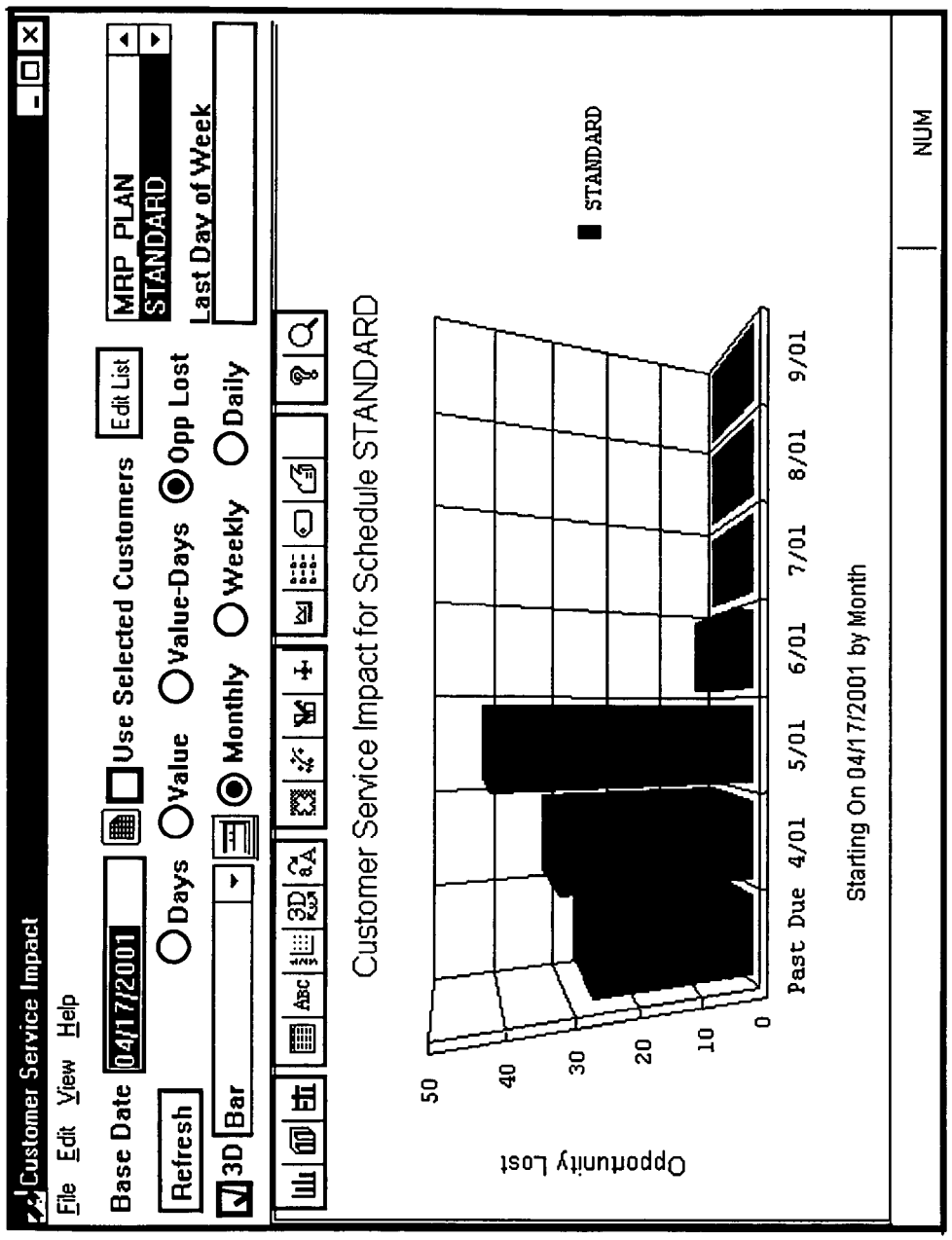
FIG. 12 is an embodiment of a customer service impact display showing opportunity lost for a single schedule.

Referring to FIG. 12, a graph of the "opportunity lost" shows the opportunity lost for all customer orders in the STANDARD schedule for each month. The graph shows the total opportunity lost, where the opportunity lost is measured as the amount of money a company would lose by not being able to put the revenue into a money market account, which would gain a predetermined amount of interest over the number of days late. In a simple embodiment, this is determined by multiplying the value-days by a predetermined percentage. In a more complex system, this could include compounding of interest. The display allows the user to redraw the graph for a different metric (days, value, value-days, or opportunity lost), a different scale (monthly, weekly, daily), a different base date, a different schedule, or using a different type of graph. The user also can use selected customers instead of all customers as is shown in the figure. By clicking on a bar for a particular element (here, a month), the user can see the detail for each order item that goes into the total customer service impact for that element. By holding down the shift key and clicking on an element, the user can see the detail for all elements. The detailed display includes customer and work order information, as well as summary and detail information. By clicking on the detail display icon next to the graph type, the tool will display the bar graph results in a spreadsheet-like numeric display, where each value displayed corresponds to a bar on the graph.

Referring to FIG. 13, a user can select one or more customers 250 to include in the customer service impact analysis. The graph display will then show only the customer service impact for the selected customers. Any number of customers, or all customers, can be selected. In the example of FIG. 13, six customers are selected.

Figure 14:
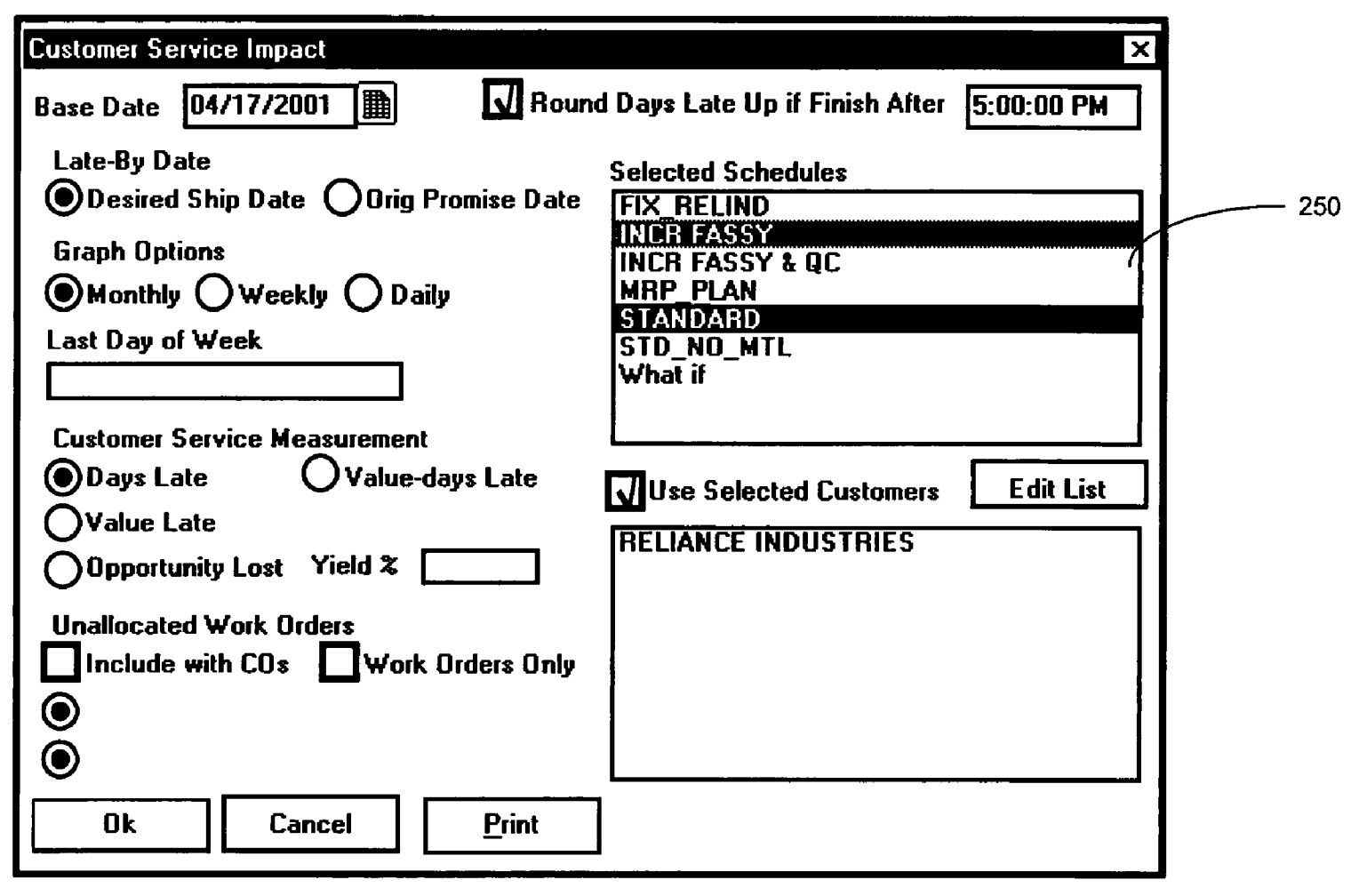

Referring to FIG. 14, a user can compare the customer service impact for two schedules, by selecting two schedules in the appropriate portion 260 of the user interface of FIG. 6. As shown in the example, two schedules are selected, STANDARD and INCR FASSY.

Figure 15:
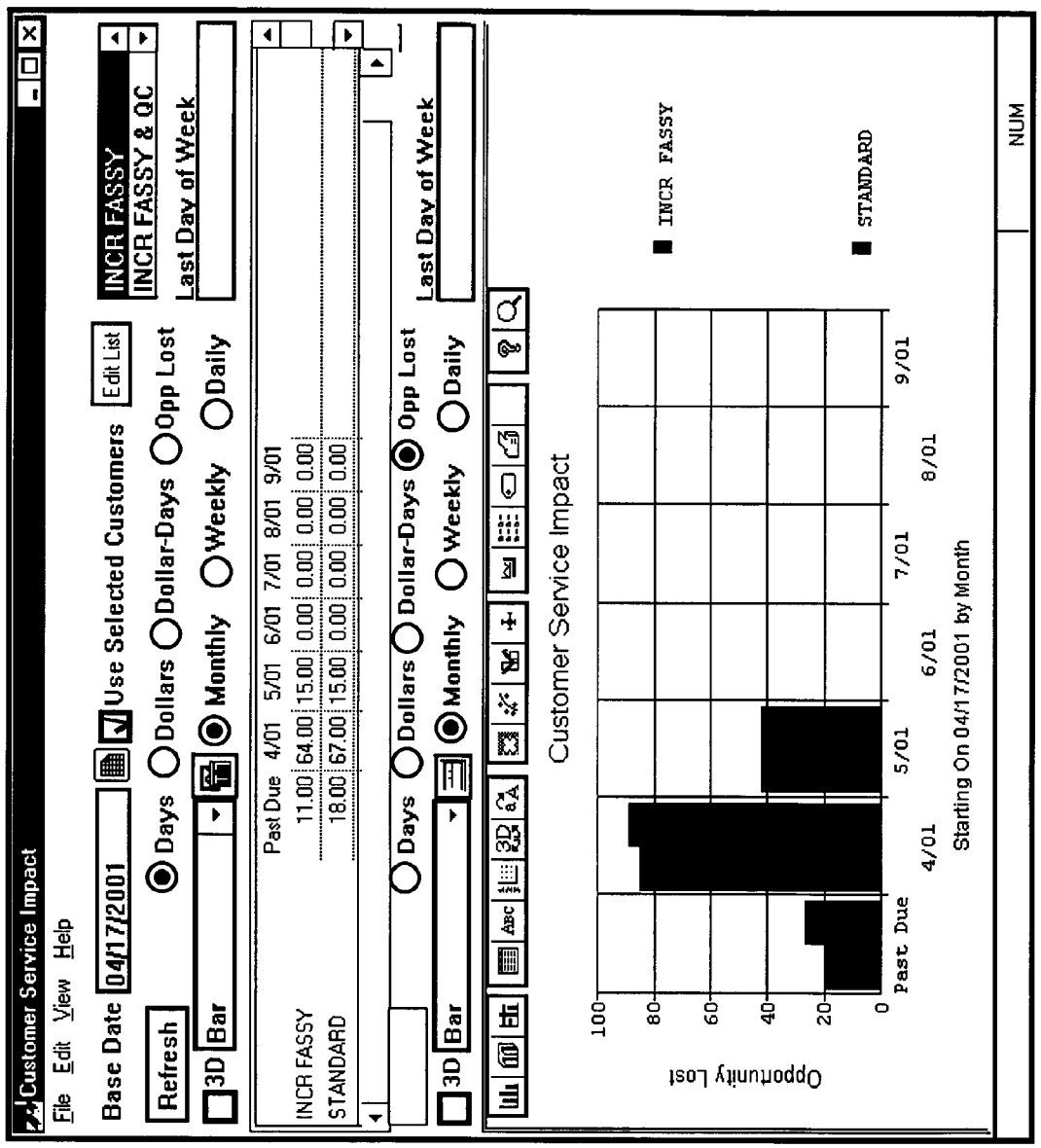
FIG. 15 is an example of an embodiment of a customer service impact display showing a days-late comparison for two schedules.

Referring to FIG. 15, the comparison of the two schedules STANDARD and INCR FASSY shows that for the past due item orders, INCR FASSY is 11 days late, and the STANDARD schedule is 18 days late. INCR FASSY is therefore better by 7 days of lateness. For the month of April (4/01), the STANDARD SCHEDULE is 67 days late, and the INCR FASSY schedule is 64 days late. Thus, for the month of April, INCR FASSY has a customer service impact that is three days "better" than the STANDARD schedule. If another customer service impact metric is chosen, the tool will show the differences between the two selected schedules. Likewise, if, as is shown in FIG. 13, only certain customers are selected, the customer service impact for those customers for the two schedules will be shown.

Figure 16A:
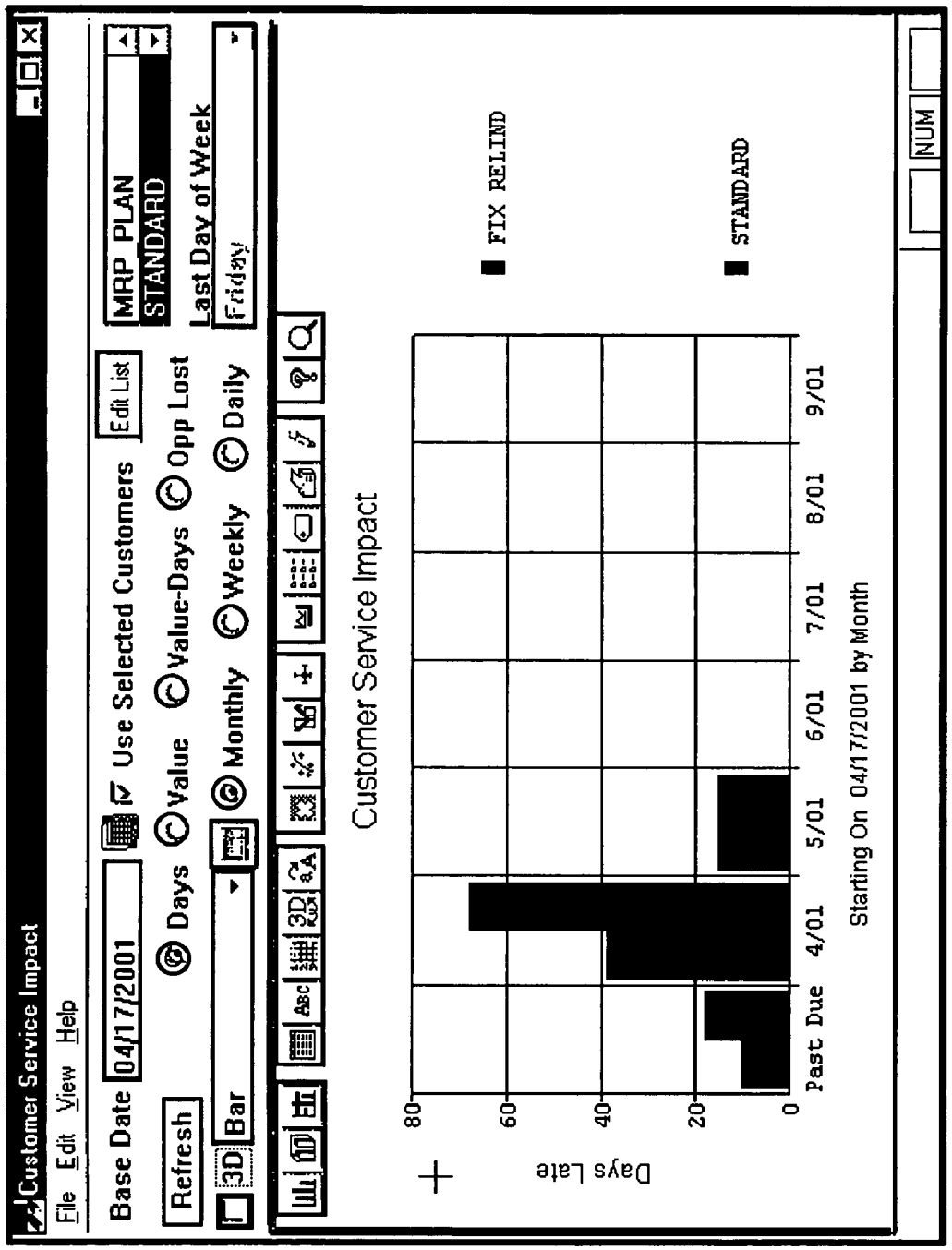
FIG. 16A is another example of a customer service impact display of the embodiment of FIG. 15.
Figure 16B:
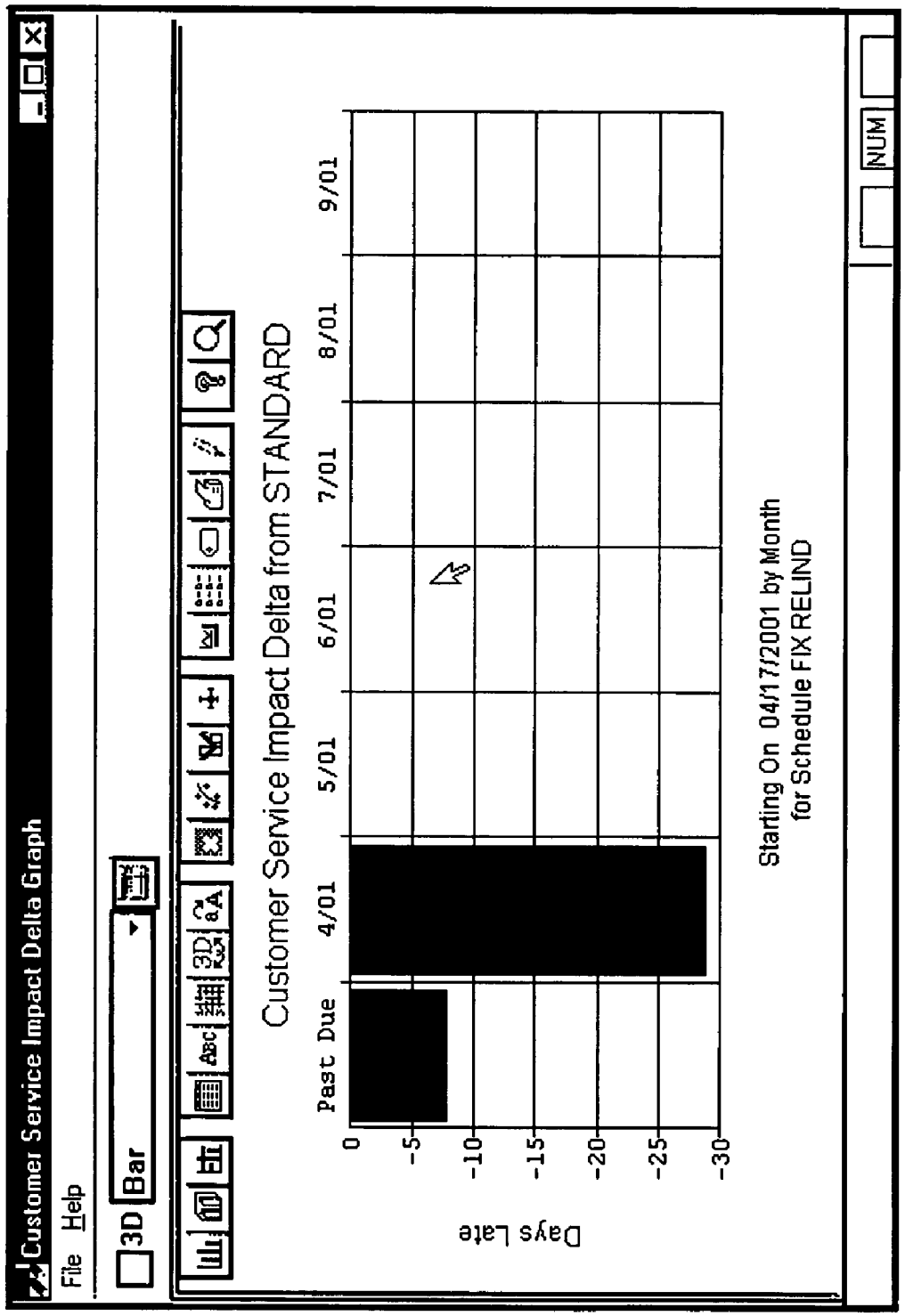
FIG. 16B is an embodiment of a delta graph of the information in the display of FIG. 16A.

Referring to FIG. 16A and FIG. 16B, if the users holds down the control key and clicks on one display bars in the comparison of FIG. 15, the user is presented with a delta graph showing the difference between the two schedules. Referring to FIG. 16A, a customer service impact comparison is shown. This comparison is like the example of FIG. 15, but with the comparison of a schedule called FIX RELIND and a schedule called STANDARD. If a user holds the control key and clicks on the display of the STANDARD schedule, the customer service impact delta graph is shown, as in the example of FIG. 16B. The bar clicked on (in this example, the STANDARD schedule) is the reference, and the graph of FIG. 16B shows the difference between the other schedule or schedules shown the customer service impact comparison (here, just the FIX RELIND schedule) and the reference (here, the STANDARD SCHEDULE). This delta display is useful for highlighting the difference between the customer service impact associated with the two schedules.

Referring to FIG. 17, a computerized method for determining customer service impact includes receiving item orders having a requested completion date (STEP 290). Generally, item orders are received as part of normal operation of a scheduling software program, but in a stand-alone implementation, the item orders can be received specifically for the purpose of customer service measurement. Generally, item orders have a desired (also referred to as a requested) completion date. Generally, item orders are received in response to customer orders.

The method also includes scheduling a scheduled completion date for each item order (STEP 291). This scheduling typically takes place as part of the operation of a scheduling software program. The scheduling may include scheduling both materials and resources, as described in U.S. Pat. No. 6,801,820, entitled METHOD AND APPARATUS OF SCHEDULING WORK ORDERS, filed Jun. 14, 2000, and incorporated herein by reference. In another embodiment, the scheduling may include the scheduling of one of materials and resources.

The method also includes selecting one or more item orders having scheduled completion dates (STEP 292). These item orders may be selected because they are due at a certain date, because they are associated with a particular customer, and so on. As in the example described above, all item orders may be selected.

The method also includes comparing the scheduled completion date with the requested completion date for each of the selected item orders (STEP 293). The requested completion date may be the desired ship date, or the original promised date. The requested completion date may be the requested completion date of a customer order that is matched to an item order by the soft allocations process described above. The scheduled completion date for the selected item order can be determined as part of the scheduling step (STEP 291).

The method also includes deriving a customer service measurement for each selected item order based on the comparing step (STEP 294). The customer service measurement is a measurement of time, money, or some combination of the two. In one embodiment, the customer service measurement includes the time difference between the requested completion date and a scheduled completion date, where the time difference is measured in one or more of years, weeks, days, hours, minutes, and seconds. In another embodiment, the customer service measurement includes the monetary value of the item order. In another embodiment, the customer service measurement includes the amount of time difference between the requested completion date and a scheduled completion date multiplied by the value of the item order. In another embodiment, the customer service measurement includes the opportunity cost, which is the amount of time difference between the requested completion date and a scheduled completion date multiplied by the value of the item order and multiplied by a predetermined interest rate. In one embodiment, the total customer service measurement is determined based on the customer service measurement for each item order.

The method can include the optional step of reporting and/or displaying customer service measurement data (STEP 295). In one embodiment, the method includes reporting the overall customer service measurement as the overall customer service measurement for a schedule. In another embodiment, the method includes displaying the customer service measurement on a calendar showing the total customer service measurement for a predetermined time period.

The method can include repeating the method steps (STEP 291 through STEP 294 or STEP 295) for different schedules to determine the customer service impact of schedule changes (STEP 246). By an iterative process, a user can develop a schedule that minimizes (or maximizes) the customer service impact for all customers, or the customer service impact for one or more particular customers. For example, in one embodiment, the method includes determining a customer service measurement for a first customer based on the customer service measurement for each item order from the first customer. In another embodiment, the method includes displaying the customer service measurement on a calendar showing the total customer service measurement for a particular customer for a predetermined time period. In another embodiment, the method includes repeating the method steps for different schedules to determine the customer service impact of schedule changes on a particular customer or group of customers.

In one embodiment, the method takes advantage of soft allocations, and so the method also includes generating a demand array of item orders, generating a supply array of manufacturing inventory, and selecting an item order in the demand array. The method further includes matching manufacturing inventory in the supply array with the selected item order, and the comparing step (STEP 293) includes comparing the scheduled completion date of an item in the supply array with the requested completion date for the matched item in the demand array. In one embodiment, the method includes generating a demand array of unshipped customer line items. In another embodiment, the method includes generating a supply array of at least one of inventory work orders and manufactured inventory.

The method may also include using other software tools to identify the cause of customer service impact.

Figure 18:
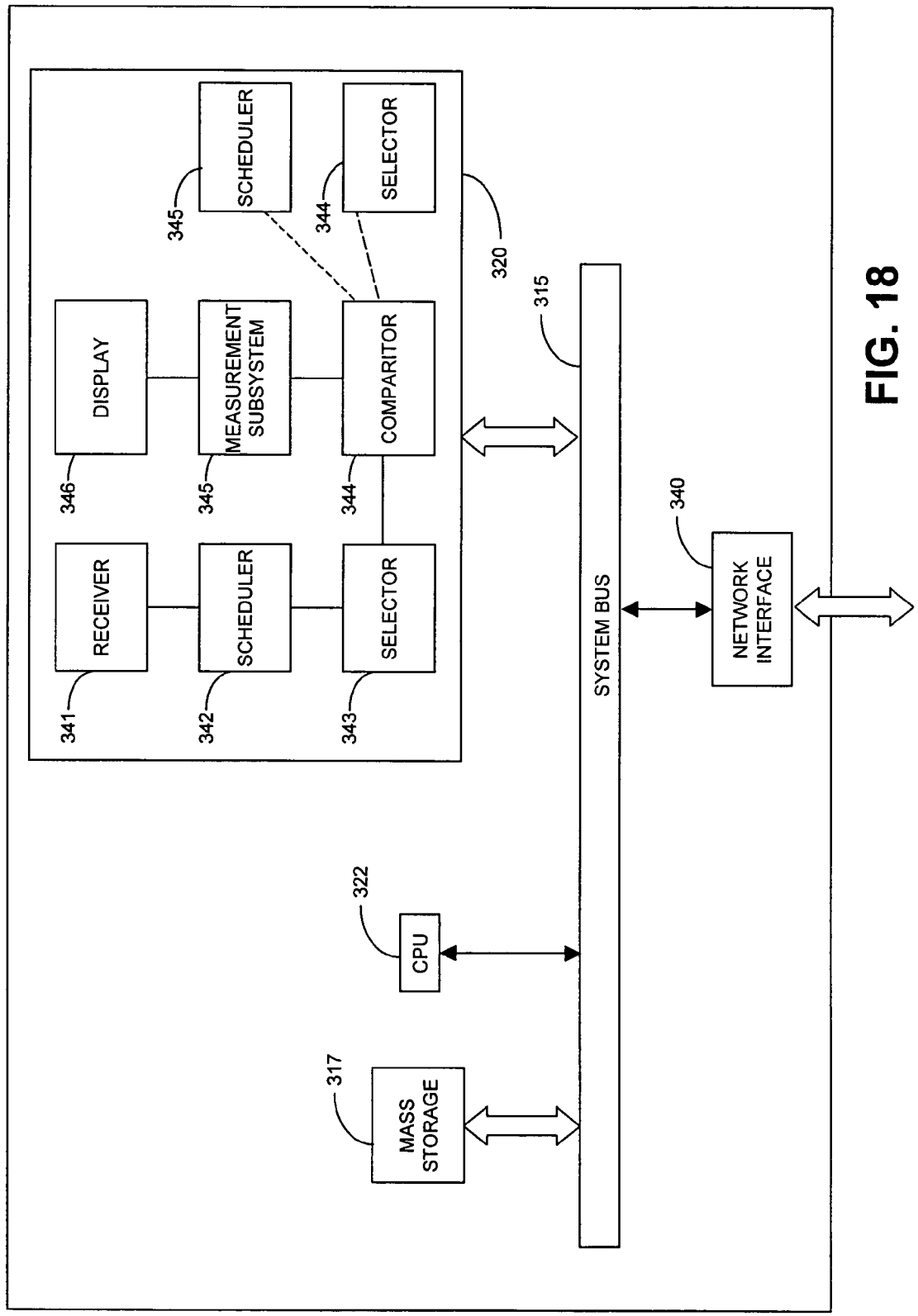
FIG. 18 is a schematic diagram of a system according to an embodiment of the invention.

Referring to FIG. 18, an embodiment of the invention runs on a computer 300. In a preferred embodiment, the computer 300 is a personal computer with a CPU 322 manufactured by INTEL CORPORATION. In other embodiments, the computer 300 can be a powerful server or mainframe computer with multiple processors, or a hand-held computer with a microprocessor. In one embodiment, the computer 300 includes a CPU 322 and a form of mass data storage 317, such as a hard disk, floppy disk, memory array, and so on, and the mass data storage 317 may include some combination of these. Generally, instructions for the CPU in the form of computer applications programs are stored in the mass storage 317 and are loaded into memory 320, which may include volatile or non-volatile memory. In other embodiments, computer applications programs may be communicated across a network to network interface 340, and placed in the memory 320 for execution by the CPU 322.

The executable instructions that control the operation of CPU 322 and thereby effectuate the functions of the invention are conceptually depicted as a series of interacting modules resident within memory 320. (Not shown is the operating system that directs the execution of low-level, basic system functions such as memory allocation, file management, and operation of mass storage device(s) 317). These modules perform the method steps described above. Also included in memory 320 or in mass storage 317 can be the supply array of inventory work orders and the demand array of unshipped customer line items.

A receiver 341 receives item orders having a requested completion date. A scheduler 342 schedules a scheduled completion date for each item order. A selector 343 selects at least one item order, each item order having a scheduled completion date. A comparator 344 compares the scheduled completion date with the requested completion date for the selected item orders. A measurement subsystem 345 derives a customer service measurement for each selected item order based on the comparing step. The measurement subsystem 345 can store the results in memory 320 or on the mass storage device 317. An (optional) display subsystem 346 reports or displays the customers service measurement to a user.

The system and method described above can also be used in conjunction with other inquiries and reports to facilitate minimization of customer service impact. For example, the utilization, contention, and material constraint inquiries described in U.S. patent application Ser. No. 09/421,834 filed on Oct. 20, 1999, entitled SYSTEM AND METHOD FOR THROUGHPUT MEASUREMENT, can be used to identify bottlenecks that have caused customer service impact. A utilization inquiry identifies resources having the highest load/capacity ratio during a specified time period. A contention inquiry identifies resources having the most contention, that is, the resource that is already allocated most frequently when attempts are made to schedule it. The resource that has the most contention is the resource most likely to make use of any additional capacity. The contention inquiry can be a better method for identifying bottlenecks than the utilization inquiry for that reason. A material constraint inquiry determines the item causing the most delay when attempts are made to schedule it.

By allowing a user to perform these inquiries on a subset of item orders within a particular schedule, the bottlenecks that are a root cause of the customer service impact associated with those item orders can be identified and alleviated. A user can determine if the lateness is the result of a resource or material bottleneck, or both. Once a bottleneck is identified, the user can then take action to correct the problem. Just as one example, if a lack of capacity at a particular workstation is the root cause of lateness for a group of item orders, by identifying the problem to be a lack of capacity at that workstation, and then adding additional capacity, customer service impact can be reduced.

Figure 19:
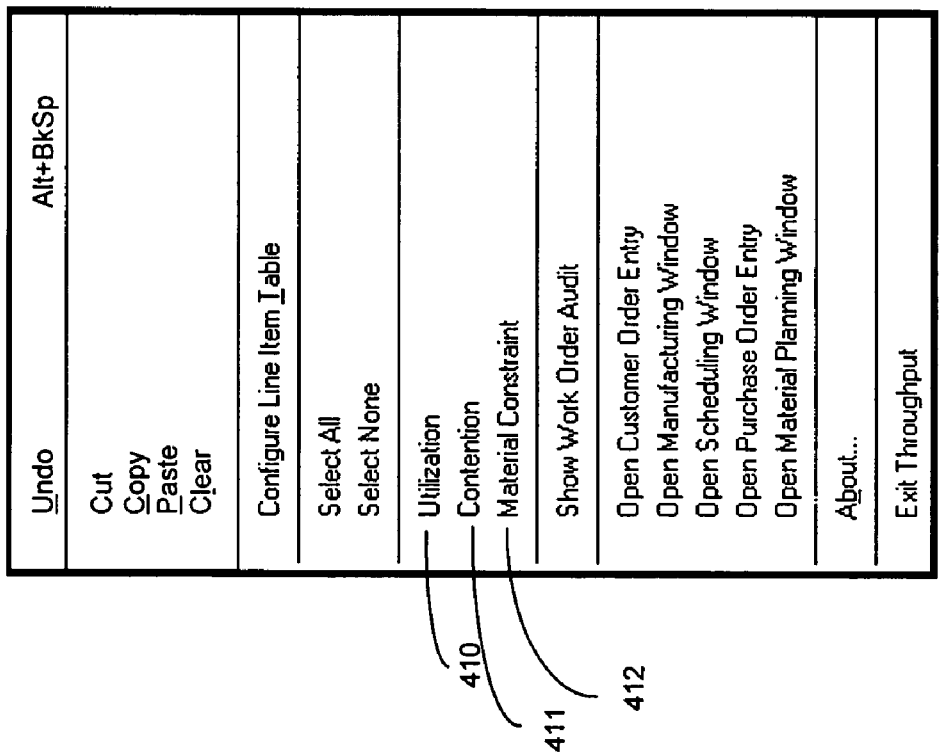
FIG. 19 is an interface for selecting utilization, contention, and material constraint inquiries in an embodiment of the invention.

Referring to FIG. 19, by clicking on the EDIT menu of the Customer Service Impact detail such as the detail display shown in FIG. 8, the user is presented with the option of performing Utilization 410, Contention 411, or Material Constraint 412 inquiries for some or all of the item orders shown in the detail display. This allows the user to focus on the late item orders for a particular time period or for a particular customer or group of customers, or both.

A utilization inquiry identifies the load/capacity ratios of resources during the specified time period, which is the time period of the display element for which detail is shown. A contention inquiry identifies resources for which the scheduling software has scheduling conflicts for the specified time period. The amount of contention can be measured by indicating the amount of time difference between when the scheduling software first attempted to schedule the resource and when the scheduling software was able to schedule the resource. A material constraint inquiry identifies bottleneck materials, such as raw materials and purchased parts, that cause disruptions in the schedule. The amount of material constraint can be measured by the amount of time difference between when the scheduling software first attempted to schedule the material and when the scheduling software was able to schedule the material.

Each of the utilization, contention, and material constraint inquiries can be used to identify a cause for the customer impact, and to alleviate the problem.

Figure 20:
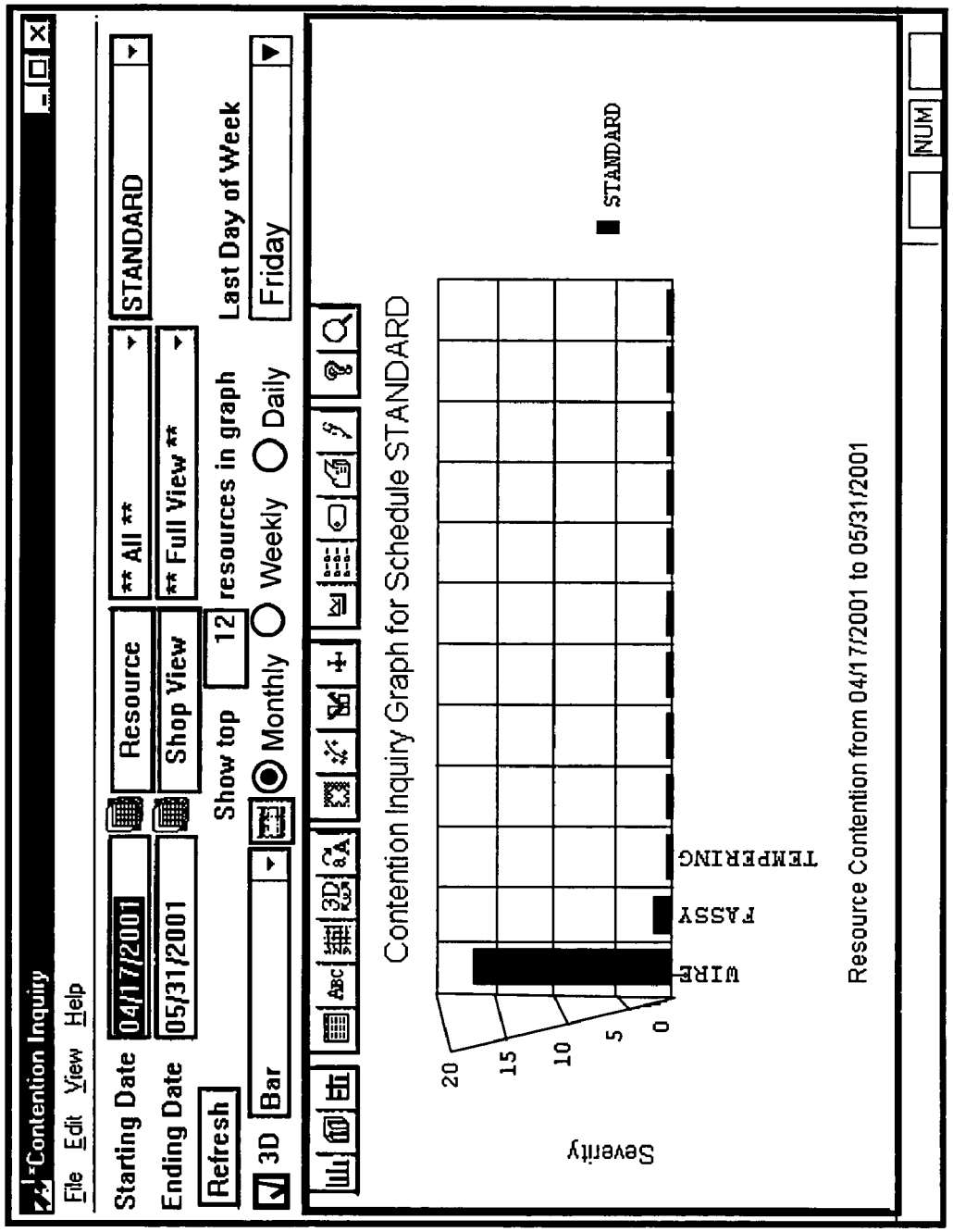
FIG. 20 is an example of a contention inquiry graph display in an embodiment of the invention.

Referring to FIG. 20, taking Contention as an example, selection of Contention from this menu will perform a contention inquiry on the subset of item orders shown in the customer service impact detail. The resulting contention inquiry graph is shown in FIG. 20. This example figure shows that the contention is for the WIRE station, with a contention severity of approximately 16, meaning that there is a total scheduling delay of 16 working hours. Likewise, a material constraint inquiry would show the total scheduling delay in scheduling material, and the utilization inquiry would show the utilization of resources.

Referring to FIG. 21, if the user clicks on the bar for the WIRE station in FIG. 20, contention inquiry detail information is shown. As is shown in the figure, three item orders have contributed to the contention; all three orders were attempted to be scheduled on Apr. 23, 2001. The third order was not scheduled until April 25, two days later. Adding more WIRE capacity in another schedule could reduce the contention for the selected subset of late item orders, and could therefore could reduce the customer service impact of those item orders. A revised schedule with added WIRE capacity can be compared to the STANDARD schedule as described above to display the benefit of the added capacity. Likewise, utilization and material constraint inquiries can be performed on subsets of item orders to identify and correct bottlenecks.

In one embodiment, a method for reducing customer service impact includes performing the steps described above to determine a customer service measurement for work orders. The method also includes identifying a subset of work orders having a customer service measurement greater than a predetermined threshold, for example, all work orders more than 0 days late. The method also includes performing at least one of a utilization, contention, and material constraint inquiry on the subset of work orders. In one embodiment, the method also includes identifying as a potential bottleneck a material or resource having the greatest result in the at least one of a utilization, contention, and material constraint inquiry, for example, identifying the material with the greatest material constraint as a bottleneck, or identifying the resource with the greatest contention as a bottleneck. A system for reducing customer service impact includes elements for performing each of the steps.

U.S. Provisional Patent Application Ser. No. 60/160,447, entitled CUSTOMER SERVICE IMPACT DETERMINATION, filed Oct. 19, 1999, is incorporated herein by reference.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A computer program product comprising a computer readable medium having computer-executable instructions thereon that, when executed by a computer, perform a method for quantitatively determining customer service impact of scheduling changes, the method comprising:

receiving customer line item orders, each having a requested completion date, wherein each customer line item is an individual customer requested product for purchase;

scheduling a scheduled completion date for each item order;

selecting at least one item order, each item order having a scheduled completion date;

comparing the scheduled completion date with the requested completion date for each selected item order, wherein said comparing comprises:

generating a demand array of item orders;

generating a supply array of manufacturing inventory;

selecting an item order in the demand array;

matching manufacturing inventory in the supply array with the selected item order; and comparing the scheduled completion date of an item in the supply array with the requested completion date for the matched item in the demand array;

displaying a group of customer service measurements comprising days late, value late, and value-days late, wherein days late is determined by the amount of time difference between the requested completion date and a scheduled completion date multiplied by the value of the item order and multiplied by a predetermined interest rate;

value late is a value of a late item order determined by multiplying a number of late item orders by a unit price per item order, then subtracting any commission and discount; and value-days late is a value-time late determined by multiplying a time difference between the requested completion date and the scheduled completion date multiplied by a value of the item order;

selecting a customer service measurement from the group of customer service measurements;

deriving a customer service impact for each selected item order based on said comparing and the selected customer service measurement; and reporting the customer service impact for each selected item order.

2. The computer program product of claim 1, wherein the value of the item order is determined by multiplying a number of item orders by a unit price per item order, then subtracting any commission and discount.

3. The computer program product of claim 1, further comprising the step of:

determining an overall customer service impact based on the customer service impact for each item order.

4. The computer program product of claim 3, further comprising the step of:

reporting the overall customer service impact as the overall customer service impact for that scheduling operation.

5. The computer program product of claim 3, further comprising:

displaying the customer service impact on a calendar showing the total customer service impact for a predetermined time period.

6. The computer program product of claim 3, further comprising repeating said receiving, scheduling, selecting, comparing, deriving, and determining for different schedules to determine the customer service impact of schedule changes.

7. The computer program product of claim 6, further comprising:

selecting one or more customers; and determining a customer service impact for each of the selected customers based on the customer service impact for each item order of the selected customer.

8. The computer program product of claim 1, further comprising the step of:

determining a customer service impact for a first customer and a second customer, based on the customer service impact for each item order from each of the first and second customers.

9. The computer program product of claim 8 further comprising the step of:

displaying the customer service impact on a calendar showing the total customer service impact for a predetermined time period.

10. The computer program product of claim 8, further comprising repeating said receiving, scheduling, selecting, comparing and determining for different schedules to determine the customer service impact of schedule changes.

11. The computer program product of claim 1, wherein said generating a demand array comprises generating a demand array of unshipped customer line items.

12. The computer program product of claim 11, wherein said generating a supply array comprises generating a supply array of at least one of inventory work orders and manufactured inventory.

13. The computer program product of claim 11, further comprising the step of:

identifying a subset of work orders having a customer service impact greater than a predetermined threshold;

performing at least one of a utilization, contention, and material constraint inquiry on the subset of work orders.

14. The computer program product of claim 13, wherein:

the utilization inquiry involves identifying resources having a highest load/capacity ratio during a specified time period;

the contention inquiry involves identifying resources allocated most frequently in scheduling; and the material limitation inquiry involves identifying material items causing scheduling delay.

15. The computer program product of claim 13, further comprising the step of:

identifying as a potential bottleneck a material or resource having the greatest result in the at least one of a utilization, contention, and material constraint inquiry.

* * * * *

UNITED STATES PATENT AND TRADEMARK OFFICE
CERTIFICATE OF CORRECTION

PATENT NO. : 7,647,241 B1
APPLICATION NO. : 09/690566
DATED : January 12, 2010
INVENTOR(S) : Lilly et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 891 days.

Signed and Sealed this

Sixteenth Day of November, 2010

David J. Kappos
*Director of the United States Patent and Trademark Office*